United States Patent
Hellstern

(10) Patent No.: US 6,192,591 B1
(45) Date of Patent: Feb. 27, 2001

(54) CERAMIC CUTLERY AND PROCESS FOR PRODUCTION THEREOF

(75) Inventor: Peter Hellstern, Villingen-Schwenningen (DE)

(73) Assignee: Sternplastik Hellstern GmbH & Co. KG (DE)

(*) Notice: Subject to any disclaimer, the term of this patent is extended or adjusted under 35 U.S.C. 154(b) by 0 days.

(21) Appl. No.: 09/265,058

(22) Filed: Mar. 9, 1999

(30) Foreign Application Priority Data

Mar. 9, 1998 (DE) .............................. 198 11 195

(51) Int. Cl.$^7$ ...................................... B26B 9/00
(52) U.S. Cl. ........................ 30/345; 30/350; 427/376.2
(58) Field of Search ................... 30/345, 346, 346.53; 427/376.2

(56) References Cited

U.S. PATENT DOCUMENTS

| | | | |
|---|---|---|---|
| 3,543,402 | * 12/1970 | Seager | 30/346.53 |
| 5,618,585 | 4/1997 | Hechler et al. | 427/376.1 |
| 5,714,236 | 2/1998 | Withington et al. | 428/195 |
| 6,063,446 | * 5/2000 | Speer et al. | 427/376.2 |
| 6,103,312 | * 8/2000 | Huber et al. | 427/376.2 |

FOREIGN PATENT DOCUMENTS 196 18 803  11/1997  (DE) .............................. B26D/1/00

OTHER PUBLICATIONS

Chemical Abstracts, vol. 81, No. 18, Nov. 4, 1974; Columbus, Ohio, US; Abstract No. 110546n, Asano, Yukiyasu et al., "chemically strengthened alumina porcelain".

* cited by examiner

Primary Examiner—Hwei-Siu Payer
(74) Attorney, Agent, or Firm—Pendorf & Cutliff

(57) ABSTRACT

Densely sintered piece of cutlery, which is produced of a high performance ceramic oxide in an injection molding process and which exhibits a decoration based upon metal oxide, which is fired in at a temperature of between 600° C. and 1,700° C., as well as process for production thereof. This type of cutlery possesses high value appearance which visually distinguishes them from conventional cutlery pieces.

15 Claims, No Drawings

CERAMIC CUTLERY AND PROCESS FOR PRODUCTION THEREOF

BACKGROUND OF THE INVENTION

1. Field of the Invention

The invention concerns a piece of cutlery as well as a process for production of such cutlery.

2. Description of the Related Art

Cutlery in the form of a ceramic blade of a cutting tool is known for example from DE 196 18 803 A1, which is the starting point of the present invention. Blades of this type have in the meantime become available in the trade and have established an excellent reputation especially in professional applications. The basis lies primarily therein, that they have an extremely high wear resistance and thus there is no need to sharpen or re-sharpen after ordinary handling. Beyond this, these blades are odor neutral and—in comparison to conventional blades of steel—are non-allergenic.

As starting material, a so-called high performance ceramic is employed, which in accordance with relevant standards is defined as a highly developed, high capacity ceramic material, which is primarily non-metallic and inorganic, and possesses certain useful properties. Accordingly, they are distinguished from conventional ceramics. Of particular importance in connection with the cutlery of this type is the group of the oxide ceramic materials, which includes among others aluminum oxide ($Al_2O_3$), magnesium oxide (MgO), zirconium oxide ($ZrO_2$), aluminum titanate (AlTi), as well as piezo ceramic (PZT).

Cutlery formed therefrom is particularly suitable for meeting high stress mechanical requirements, so long as it is densely sintered, that is, exhibits a density which is greater than 95% of the maximum theoretical density of the starting material. A practically completely pore-free outer surface can be obtained therewith.

Despite the advantages which are undisputed in the technology, these ceramic blades or, as the case may be, the ceramic knives formed therewith, have not found widespread acceptance, in particular in private households. The reason therefore could be, among other things, that the ceramic blades, or the cutlery provided with such blades, possess a less-than-attractive appearance. As a result of the selection of starting materials, in combination with the sinter process used in the production, there results a substantially white, flat outer surface, which at the first glance appears confusingly similar to cheap plastic knives. This visual association with disposable cutlery may be one of the main reasons for the reluctance in consumer acceptance.

SUMMARY OF THE INVENTION

The present invention is thus concerned with the problem, of providing a ceramic piece of cutlery of the above described type, as well as a process for the production thereof, in which the above described disadvantages do not occur. In particular the optical appearance should be improved to the extent of broadening the distinction with respect to the above mentioned plastic cutlery, so that potential consumers even after only a fleeting glance immediately recognize that this piece of cutlery is a qualitatively high value product.

DETAILED DESCRIPTION OF THE INVENTION

The invention is based upon the idea, of providing the cutlery with a decoration based on metal oxide, which is permanently fixed by firing and thus does not require glazing. Therewith a piece of cutlery is produced, which opens new avenues in terms of decor. With retention of the here known, above described utilitarian characteristics, in particular the resistance to wear, an optical effect is achieved, which makes it possible to recognize the high value of the product and which dispels any possible conceptual association with plastic cutlery.

Over-coating technology is basically known from the porcelain industry, wherein a series of different techniques are known with which to optically increase the value of dishes and other household articles. Despite the high level of advancement of this technology, hitherto there has not been any recognizable relevance to the decoration of this type of ceramic cutlery. The reason therefore could among other things lie therein, that in the porcelain industry the conventional decorations are normally covered with a glazing, which would not be suitable for articles subject to strong wear such as, for example, blades of knives, due to lack of wear resistance.

Also, other established coloring technologies such as those for example for decoration of tiles, in which porous solutions penetrate into the porous outer surface and which exhibit no glazing, are not suitable for application to the present field. The cutlery pieces of concern herein possess, on the basis of the employed starting materials, an inert and practically pore-free outer surface, upon which such dye solutions are unable to find attachment. A permanent application of color is thus not possible.

As preferred metal oxides there may be employed in particular iron, copper, manganese, cobalt or chrome oxide, which also in the case of surfaces exposed to strong wear such as for example in blades of a cutting tool exhibit an excellent wear resistance.

In cutlery for daily use it is desired and mostly also necessary that the decoration is dishwasher resistant. Therewith it is ensured that also in the standardized testing process no type of cyto-toxicity is released.

Particularly good wear resistance characteristics of the decoration are then achieved, when it is fired in at a temperature in the range of between 1300° C. and 1700° C.

In practice it has also been found to be advantageous, when the decoration or as the case may be the color application is so selected, that in the end product a firing depth of up to 0.5 mm, preferably from 0.01 to 0.3 mm, is achieved.

The cutlery pieces can, as a result of the injection molding manufacturing process, assume various shapes. Particular advantages are realized in cutlery in the form of a blade of a cutting tool, since herein in particular measure the hardness of the materials comes to bear. Therein, it is possible to inject the cutlery piece inclusive of the grip in one piece, or alternatively to subsequently mount the grip, for example by post injecting, or to secure it by other means and manners. Thereby it is also possible to select a different material for the grip, in order for example to pair particularly superior combinations of materials.

Further, it is possible to produce cutlery in the form of spoons or forks, in order to form a complete cutlery set. A set of cutlery of this type makes possible a completely new manner in which to decorate a table, since the complete set of cutlery of a setting can be selected for example to match the decor of the dishes and/or the table linens. Besides this there is a completely new grip feel of such cutlery pieces in which the grip part is also made of ceramic material. Temperature influences, such as occur in the conventional cutlery pieces of metal, do not occur.

A further aspect of the invention is concerned with the provision of a process for production of a piece of cutlery in which a densely sintered high wear resistant oxide ceramic is shaped in an injection molding process, in particular a powder-injection molding process, to a green shape and subsequently is densely sintered. In accordance with the invention a decal or decoration based on metal oxide is subsequently applied and subsequently sintered at temperature in the range of between 600° C. and 1,700° C. By this simple measure it becomes possible to achieve the desired optical effect without disadvantageously influencing the characteristics of the finished product. A particularly durable application of the decoration succeeds when a temperature of between 1,300° C. and 1,700° C. is selected for firing.

As metal oxide iron, copper, manganese, cobalt or chrome oxide are particularly suitable. In the selection thereof it is essentially necessary to take notice of the corresponding maximum firing temperature.

For application of the decal or decoration a series of well known processes are available.

With motifs, ornamentations, and similar decorations printing processes have been found to be particularly useful. Besides the screen printing processes known from other areas of technology there are in particular to be mentioned transfer printing, dabbing transfer and sponge decoration processes. In transfer printing the motif is located on a carrier film, and is slid onto the piece of cutlery. During the firing the carrier film is dissolved and the components are driven out. The motif is permanently burned into the outer surface.

In dabbing transfer processes, also known as dabbing printing, the motif is printed or pressed using a microcellular rubber. The sponge decoration process is based on a similar principle, in which the dye is transferred using a sponge.

The decoration can however also be applied by spraying by machine or by hand, whereby an exceptionally even application of color can be achieved. Hardly any limits can be set with respect to the designs of the motif, so that also individualized designs can be realized. For example it is conceivable that initials or full names of a person can be applied in this manner.

Likewise, it is possible to apply the design by hand using a brush.

An optically particularly interesting effect can be achieved when the green form is sintered in a vacuum or in inert gas. The cutlery produced in this manner attains a glass-clear appearance, which in combination with the decoration makes possible a completely new type of cutlery. Such cutlery harmonizes particularly with the drinking glasses of a table setting and lends to the place setting overall a unconventional lightness.

Finally, a broad pallet of colors can be provided, in particular on the basis of the above described metal oxides, when the firing is undertaken under vacuum, inert gas, oxidizing or reducing atmospheres. The appropriate selection of the atmosphere results in a reproducible shade of color, which is indispensable in the manufacture of cutlery.

The above described invention is particularly suitable for making available of complete sets of design oriented cutlery, wherein all the various pieces of cutlery exhibit a matching decor. It goes without saying that the cutlery inclusive of the grip portion can be made as a single piece of the above described high wear resistant ceramic or also can be provided with a separate grip part which may also be of another material.

The invention will finally be described on the basis of a concrete example, in which the blade of a knife is provided with a decor.

As starting material there was selected a so-called mixed ceramic, which is essentially comprised of the components aluminum oxide ($Al_2O_3$) and zirconium oxide ($ZrO_2$). The starting material was formed into a green shape in a powder injection process (CIM=Ceramic Injection Molding) and subsequently sintered at a temperature at approximately 1550° C. to 1750° C. The thus produced blade exhibited a density which was greater than 95% of the theoretical density and which exhibited an inert and practically pore free outer surface. Thereafter cobalt oxide was stirred in water and applied with a brush to the outer surface in the shape of a rectangle and subsequently fired at a temperature of approximately 1400° C.

After the firing process there resulted a deep blue coloration of the rectangle area to which the dye was applied with sharp edges. A firing depth of approximately 5 μm was achieved.

For testing of the wear resistance the blade was rubbed in the area of the applied color with a diamond polishing paste, whereby the deep blue color permanently remained. A subsequent standard test confirmed that no kind of cytotoxicity was emitted by the blade.

What is claimed is:

1. A cutlery set comprising at least one spoon, one fork, and one knife, wherein each piece is a densely sintered cutlery piece produced from a high performance oxide ceramic in an injection molding process and having a decoration provided directly on the oxide ceramic by screen printing, transfer printing, dabbing transfer, by hand or sponge decoration, wherein said decoration is a metal oxide based decoration which has been fired directly onto the oxide ceramic at a temperature in a range of between 600° C. and 1700° C.

2. A densely sintered cutlery piece produced from a high performance oxide ceramic in an injection molding process and having a decoration provided directly on the oxide ceramic by screen printing, transfer printing, dabbing transfer, sponge decoration or by hand, wherein said decoration is a metal oxide based decoration which has been fired directly onto the oxide ceramic at a temperature in a range of between 600° C. and 1700° C.

3. A cutlery piece according to claim 2, wherein the metal oxide is iron, copper, manganese, cobalt or chrome oxide.

4. A cutlery piece according to claim 2, wherein the decoration is dish washer safe.

5. A cutlery piece according to claim 2, wherein the decoration is fired at a temperature in the range of between 1,300° C. and 1,700° C.

6. A cutlery piece according to claim 2, wherein the decoration has a fired depth of up to 0.5 mm.

7. A cutlery piece according to claim 2, wherein the decoration has a fired depth of between 0.01 and 0.3 mm.

8. A cutlery piece according to claim 2, in the form of a blade of a cutting implement.

9. A process for production of a piece of cutlery, in which a high performance ceramic oxide is formed by a process comprising injection molding to a green form, sintering, applying directly onto the oxide ceramic a decoration based on metal oxide by screen printing, transfer printing, dabbing transfer, sponge decoration or by hand, and firing at a temperature in the range of between 600° C. and 1,700° C.

10. A process according to claim 9, wherein that decoration is fired at a temperature in the range of between 1,300° C. and 1,700° C.

11. A process according to claim 9, wherein the metal oxide is iron, copper, manganese, cobalt or chrome oxide.

12. A process according to claim 9, wherein the decoration is sprayed on by machine or by hand.

13. A process according to claim 9, wherein the decoration is mechanically applied by hand.

14. A process according to claim 9, wherein the green form is sintered in a vacuum or under inert gas.

15. A process according to claim 9, wherein the decoration is fired-in under vacuum, inert gas, oxidizing or reducing atmosphere.

* * * * *